UNITED STATES PATENT OFFICE.

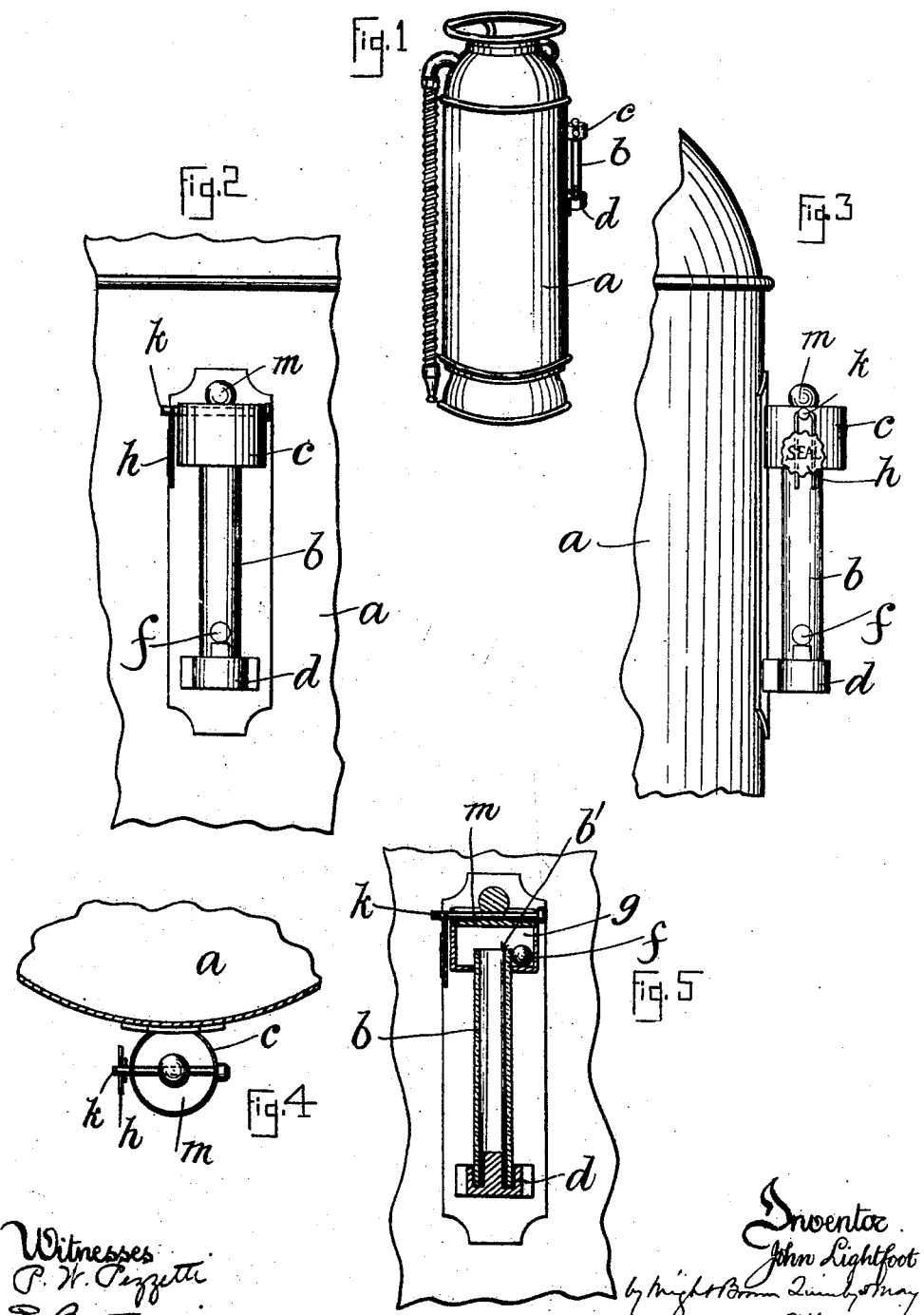

JOHN LIGHTFOOT, OF ACCRINGTON, ENGLAND.

INDICATOR FOR INVERTIBLE VESSELS.

No. 910,698.      Specification of Letters Patent.      Patented Jan. 26, 1909.

Application filed May 8, 1906. Serial No. 315,846.

*To all whom it may concern:*

Be it known that I, JOHN LIGHTFOOT, a subject of the King of Great Britain, and resident of 116 Whalley road, Accrington, in the county of Lancaster, England, have invented a certain new and useful Indicator for Invertible Vessels, of which the following description, together with the accompanying sheet of drawings, is a specification.

In connection with vessels which are to be kept or maintained in one position for a period and are then to be turned over or inverted to be brought into use after which they require readjustment, either of their contents or parts in connection therewith, before being replaced in their former positions, it is most desirable to have indicating means which will show when and whether such vessels have been inverted. Especially is this the case in connection with portable fire extinguishing apparatus or extincteurs of the class which when not in use, have to be kept in a certain erect position and which, on being brought into use, have to be inverted to allow the flow of certain liquids contained thereby as is well understood, and it is to this class of apparatus that my said invention most particularly relates and it is in connection with same that I have illustrated it in the accompanying sheet of drawings from the following description of which its application to other vessels to be similarly handled will readily be understood.

Figure 1 is a perspective view showing portable fire extinguishing apparatus with my indicator mounted thereon. Fig. 2 is a front elevation of my indicator drawn to an enlarged scale, the vessel upon which it is fixed being shown as cut away. Fig. 3 is a side elevation of parts shown by Fig. 2. Fig. 4 is a view of the parts shown by Fig. 2, as seen from above. Fig. 5 is a similar view to Fig. 2 but shows my indicator in section. Figs. 3, 4 and 5 are drawn same scale as Fig. 2.

As is well known the inversion of the vessel $a$ at any time when charged with the proper contents for fire-extinguishing purposes, causes chemical actions or re-actions to be brought about, so that such inversion ought never to take place until it is desired to bring the apparatus into actual use for extinguishing a fire, and my invention consists in the application of means thereto that will clearly and readily indicate whenever said apparatus has been inverted whether accidentally or otherwise in order that without disturbing said apparatus in anyway, those responsible for their efficient use, or others, may easily see whenever they have been detrimentally interfered with.

To attain the object of my invention I mount a glass or other transparent tube $b$ in bearings $c, d$ which support it in vertical alinement with the vessel $a$. Within this tube $b$ I place a ball or sphere $f$ which will roll or move freely within same, and I arrange the upper bearings $c$ to be hollow or to form a cavity $g$ so that by the end $b'$ of said tube $b$ projecting within said cavity $g$ for a certain distance as shown (or by forming the projecting part $b'$ integrally with or fixed to the bearing $c$ instead of same being an extension of the tube $b$), on the ball or sphere $f$ being caused to travel along said tube $b$, as it would by the apparatus or vessel $a$ being inverted, until it reached the cavity $g$, it would then enter same and fall or move from being opposite the orifice in the tube $b$ and would thus be retained within the cavity $g$ (as shown by Fig. 5) from which it could not readily be removed to be replaced within the tube $b$ until the attendant opened access to the cavity $g$ by breaking the seal $h$ removing the pin $k$ and then taking away the cover $m$, in this manner whenever said ball or sphere $f$ was not in its proper place within the tube $b$ as shown by Figs. 2 and 3 it would be a clear indication that the apparatus was not in order or that it had been tampered with.

Instead of the seal $h$ being employed for securing the pin $k$ in position, a padlock or like device arranged to be removable by the proper authorized party alone, might be made use of.

Such being the nature and object of my invention what I claim is: —

1. The combination with an invertible fire extinguisher, of a visible movable element carried thereby and adapted to show, by a change in its position, that the extinguisher has been inverted, a container for the said movable element being permanently attached to the extinguisher and having means for preventing the return of the movable element to its original position after an inversion of the extinguisher.

2. An indicator for an invertible vessel comprising a transparent tube, a spherical body movable freely within said tube, bearings for said tube, a trap receptacle at one end of said tube, and means whereby access is afforded to said receptacle.

3. An indicator for an invertible vessel, comprising a transparent tube, a spherical body movable freely within said tube, bearings for said tube, a trap receptacle for the spherical body at one end of the tube, a cover for said receptacle and sealed means for securing said cover in position, substantially as herein specified.

4. An indicator for an invertible vessel comprising a transparent tube, a spherical body movable within said tube, bearings for said tube, a trap receptacle formed to receive he spherical body at one end of the tube, a cover for said receptacle and a lock device for securing said cover in position, substantially as herein specified.

In testimony whereof I have affixed my signature in presence of two witnesses.

JOHN LIGHTFOOT.

Witnesses:
ERNALD SIMPSON MOSELEY,
MALCOLM SMETHURST.